US006715772B1

(12) United States Patent
Micciche et al.

(10) Patent No.: US 6,715,772 B1
(45) Date of Patent: Apr. 6, 2004

(54) MEANS FOR VENTING GAS PRESSURE BUILDUP FROM A PACKAGE

(75) Inventors: Robert P. Micciche, Somerset, NJ (US); David B. Richiger, Ridgefield, CT (US); Uma Tripathi, Gladstone, NJ (US)

(73) Assignee: Playtex Products, Inc., Westport, CT (US)

( * ) Notice: Subject to any disclaimer, the term of this patent is extended or adjusted under 35 U.S.C. 154(b) by 0 days.

(21) Appl. No.: 09/501,542

(22) Filed: Feb. 9, 2000

(51) Int. Cl.[7] .................................. F16J 15/08
(52) U.S. Cl. .................................. 277/650
(58) Field of Search .................................. 277/650, 910, 277/918; 220/378

(56) References Cited

U.S. PATENT DOCUMENTS

| | | | | | |
|---|---|---|---|---|---|
| RE24,856 | E | | 8/1960 | Panagrossi et al. | |
| 2,951,721 | A | | 9/1960 | Asp | |
| 3,312,376 | A | | 4/1967 | Rooney | |
| 3,676,289 | A | | 7/1972 | Katsuyuki et al. | |
| 3,953,566 | A | * | 4/1976 | Gore | 264/288 |
| 4,892,632 | A | * | 1/1990 | Morris | 204/128 |
| 4,940,518 | A | * | 7/1990 | Morris | 204/128 |
| 5,117,999 | A | | 6/1992 | Canzano et al. | |
| 5,128,209 | A | | 7/1992 | Sakai et al. | |
| 5,139,878 | A | | 8/1992 | Kim et al. | |
| 5,368,923 | A | | 11/1994 | Tippett | |
| 5,418,023 | A | | 5/1995 | Hernandez et al. | |
| 5,427,831 | A | | 6/1995 | Stevens | |
| 5,486,010 | A | * | 1/1996 | Hamilton et al. | 277/1 |
| 5,492,336 | A | | 2/1996 | Barna et al. | |
| 5,494,301 | A | | 2/1996 | Hamilton et al. | |
| 5,522,155 | A | | 6/1996 | Jones | |
| 5,524,908 | A | * | 6/1996 | Reis | 277/233 |
| 5,551,706 | A | | 9/1996 | Barna et al. | |
| 5,581,019 | A | * | 12/1996 | Minor et al. | 285/910 |
| 5,589,028 | A | | 12/1996 | Robinson et al. | |
| 5,615,897 | A | * | 4/1997 | Akita | 277/233 |
| 5,695,197 | A | | 12/1997 | Farley et al. | |
| 5,749,607 | A | * | 5/1998 | Carr | 285/93 |
| 5,866,056 | A | * | 2/1999 | Werner | 264/104 |
| 5,879,789 | A | * | 3/1999 | Dolan et al. | 428/212 |
| 5,916,671 | A | * | 6/1999 | Dauber et al. | 428/317.3 |
| 6,092,811 | A | * | 7/2000 | Bojzrczuk et al. | 277/627 |

* cited by examiner

*Primary Examiner*—William L. Miller
(74) *Attorney, Agent, or Firm*—Ohlandt, Greeley, Ruggiero & Perle, LLP

(57) ABSTRACT

A gasket that is capable of venting gas from a positive pressure gas generating system in a package, such as a bottle or a container. In so doing, the gasket prevents the liquid contained within the package from leaking out. The gasket has a core that is impermeable to liquids, with a first side and a second side opposite the first side. A first outer layer is connected to the first side and a second outer layer is connected to the second side. The first outer layer and the second outer layer are made of a gas permeable membrane. Furthermore, the gasket provides a method of venting gas from the package. The method includes securing a closure fitting shaped to form a seal to an opening of a package. The seal contains a gasket capable of venting gases while preventing liquid from leaking therefrom.

9 Claims, 4 Drawing Sheets

MEANS FOR VENTING GAS PRESSURE BUILDUP FROM A PACKAGE

BACKGROUND OF THE INVENTION

1. Field of the Invention

The present invention relates to gaskets. More particularly, the present invention relates to a gasket that enables gas to be vented from a package, while preventing a liquid from leaking therefrom. The gasket is particularly suited for use in a spray or pump package.

2. Description of the Prior Art

Many liquid products are placed and held in a package that may take the form of a bottle or container. Often the package has a dispensing mechanism, such as a trigger spray or finger pump integrated into the package.

These systems may hold liquids that volatilize into a gas, which increases the pressure inside the package creating a positive pressure gas generating system. In a closed bottle or container, the positive pressure gas generating system can build up pressure that will ultimately distort the package. In fact, if the pressure is great enough, the package could burst and release the liquid held inside. To resolve this problem, gaskets have been made that permit excess gas to exit the package while preventing the liquid contained within from leaking out. These gaskets have a single gas permeable layer bonded to a core that prevents liquid from leaking out. DURAVENT gaskets manufactured and sold by W. L. Gore & Associates, exemplify such gaskets. They are designed so that one side of the gasket allows gas to enter or escape a container along the threads of a cap.

However, in order for the gasket to function properly, the gasket must be positioned in the assembled piece so that the gas permeable layer is facing the liquid side. To properly place the gasket in the workpiece requires the use of an orientation device, i.e., human or mechanical means. This extra manufacturing step can significantly increase the manufacturing costs of the finished product.

BRIEF SUMMARY OF THE INVENTION

It is an object of the present invention to provide a gasket that is capable of venting gas from a package, such as a bottle or a container.

It is another object of the present invention to provide such a gasket that prevents liquid from leaking out of the package.

It is still another object of the present invention to provide such a gasket that is used in connection with a spray or pump dispenser.

It is still yet another object of the present invention to provide such a gasket that can be positioned in a closure fitting without using an orientation device.

It is a further object of the present invention to provide a method for venting gas from the package, while preventing liquid from leaking therefrom.

To accomplish the foregoing objects and advantages, the present invention, in brief summary, is a multi-layer gasket that is capable of venting gas from a bottle or a container while preventing liquid from leaking. The gasket is particularly suited for use in connection with a spray dispenser, such as a trigger spray, or pump dispenser, such as a finger pump. The gasket comprises a liquid impermeable core having a first side and a second side, and a first gas permeable outer layer connected to the first side and a second gas permeable outer layer connected to the second side opposite the first layer. More preferably, the core and two outer layers are laminated together.

The present invention also includes a method for relieving and preventing gas pressure buildup in a package, by utilizing a closure fitting having the gasket of the present invention that allows for passive venting of excess gas pressure from the package. The method comprises the step of securing a closure fitting having a gasket of the present invention about an opening of a package without the need for orientation of the gasket.

DETAILED DESCRIPTION OF THE INVENTION

Figure 1:
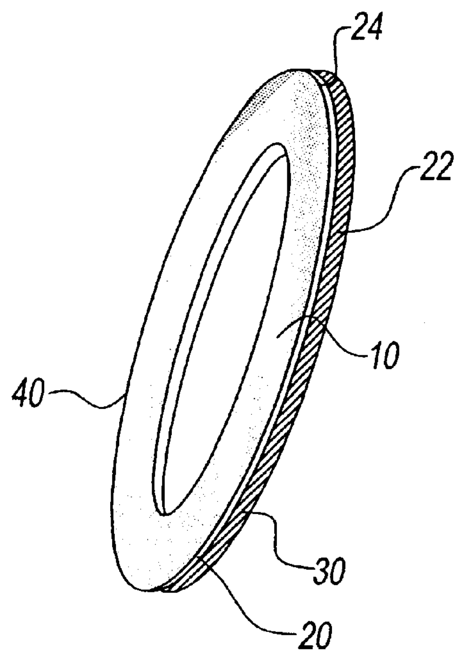
FIG. 1 is a perspective view of a gasket of the present invention.

Referring to the drawings and, in particular, FIG. 1, there is provided a gasket generally represented by reference numeral 10. The gasket 10 is capable of venting gas from a package while preventing liquid from leaking therefrom. The package may be a bottle, a container, a cup or any other analogous object capable of holding a liquid.

The gasket 10 is multi-layered. Gasket 10 has a core 20 with a first outer layer 30 connected to a first side 22 of the core and a second outer layer or membrane 40 connected to a second side 24 of the core. In the FIG. 1 embodiment, gasket 10 has two outer layers 30, 40 that are on opposite sides of core 20, forming a tri-layer gasket.

The core 20 is made of a material that is impermeable to liquids and gases. Suitable materials include, but are not limited to, polyalkylene materials. Such polyalkylene materials include polyethylene, polypropylene, polybutylene, and mixtures thereof. Preferably, liquid impermeable core 20 is made of polyethylene.

Figure 2:
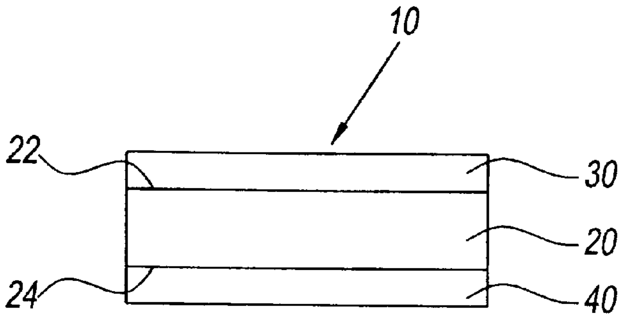
FIG. 2 is a perspective view of a cross-section of the gasket of FIG. 1.

Referring to FIGS. 1 and 2, outer layers 30 and 40 are each made of a gas permeable membrane material. The gas permeable membrane enables gas molecules to permeate through the membrane.

Preferably, gas permeable outer layers or membranes 30, 40 are each made of a fluoropolymer material. More preferably, the fluoropolymer material is an expanded polytetrafluoroethylene (ePTFE) polymer. One example of a commercially available expanded PTFE is a material from W. L. Gore under the tradename SUPER-RESISTANT GORE-TEX® MEMBRANE.

Moreover, outer layers 30, 40 are either bonded or laminated to first side 22 and second side 24 of core 20 so that outer layers 30, 40 and the core are a one piece, and perhaps integral, structure.

The thickness of core 20 is about 0.015 inches to about 0.150 inches and, preferably, about 0.020 inches to about 0.100 inches. The thickness of each outer layer 30 or 40 is about 0.001 inches to about 0.050 inches and, preferably, about 0.005 inches to about 0.030 inches. The actual thickness of outer layers 30, 40, and thus gasket 10, within the ranges set forth above will depend to a certain extent to the amount of pressure applied to secure the gasket to a package as will be discussed below.

Figure 3:
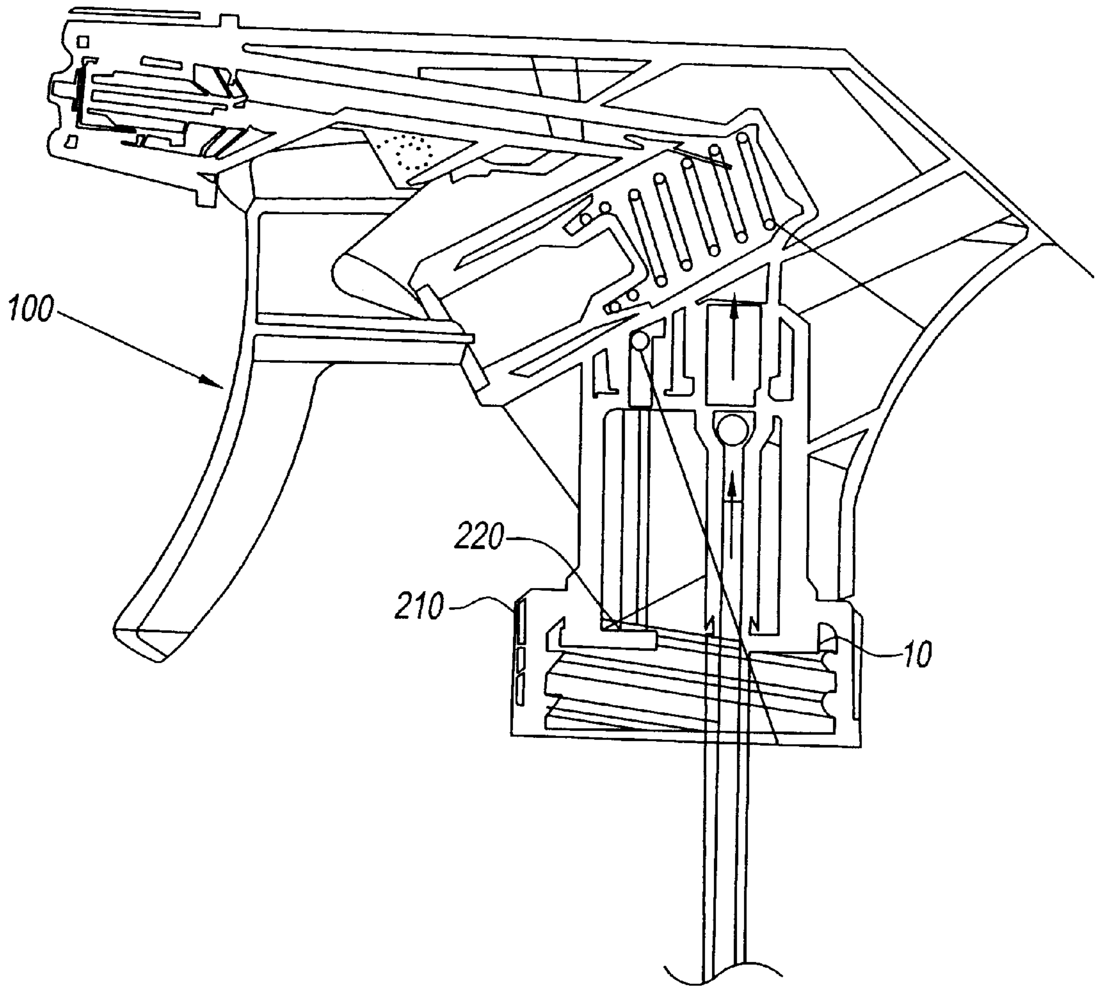
FIG. 3 is a perspective view showing the gasket of FIG. 1 in a trigger spray assembly.
Figure 4:
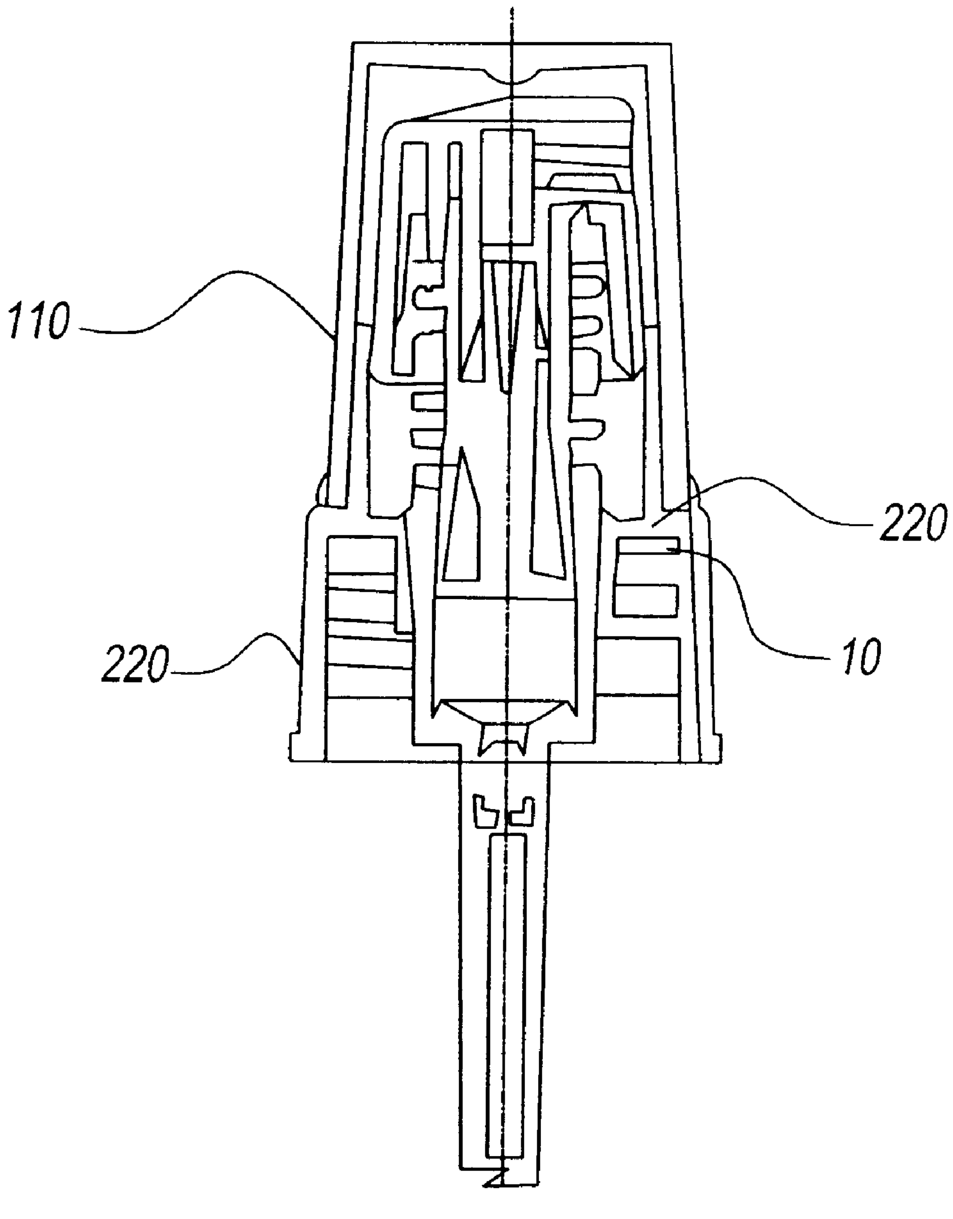
FIG. 4 is a perspective view showing the gasket of FIG. 1 in a finger pump assembly.

FIG. 3 shows the position of gasket 10 in a trigger spray mechanism 100. FIG. 4 shows the position of gasket 10 in a finger pump mechanism 110. In each mechanism or closure fitting, gasket 10 is positioned against an underside 220 of a cap closure 210.

Figure 5:
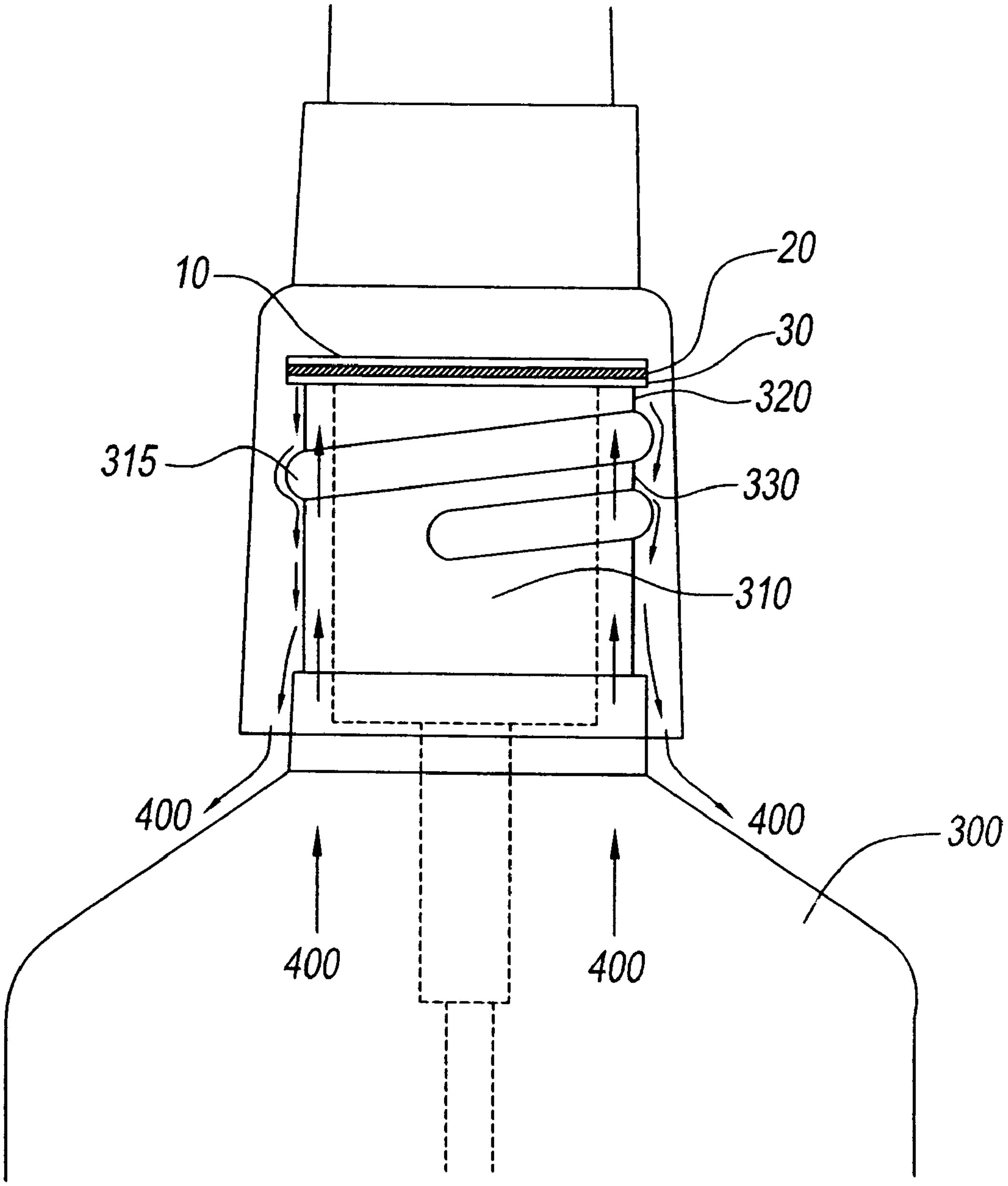
FIG. 5 is a front view with portions cut away showing the flowpath of gas through the gasket of FIG. 1.

FIG. 5 is a schematic view that better shows the positioning of gasket 10 on a package, such as container or bottle 300, having either mechanism 100, 110. With either mechanism 100, 110 secured to bottle 300, there is an amount of gas 400 and, preferably, liquid in the bottle.

The bottle 300 has a receiving portion that mates with a closure fitting, such as mechanisms 100, 110 shown in FIGS. 3 and 4, respectively. In FIG. 5, the receiving portion is necked down portion 310 preferably with threads 315. The threads 315 are adapted to receive mating threads in the interior of either mechanism 100, 110. The necked down portion 310 has an opening with a peripheral edge 320 and an exterior surface 330. The above example demonstrates one embodiment. However, it should be understood that other embodiments are also contemplated including, but not limited to, snap fittings.

Referring to FIG. 5, outer layer 30 in the tri-layer gasket 10 shown in FIG. 1 is positioned to contact peripheral edge 320. Gas 400, contained within bottle 300, permeates through outer layer 30, travels tangentially across gasket 10, and then down along exterior surface 330. However, liquid is prevented from passing by gasket 10, since both core 20 and outer layer 30 are constructed of a liquid impermeable material.

Significantly, the tri-layer gasket 10 will invariably have the gas permeable outer layer facing the liquid surface so that it can be installed without concern for its orientation.

The diameter or radial size and the shape of gasket 10 will vary according to its application. These dimensions are largely determined by package design. For example, the diameter or radial size and shape of the opening of bottle 300 and the size and shape of the interior of mechanisms 100, 110 for receipt of gasket 10 will determine the size and shape of the gasket. Basically, gasket 10 needs to be sized and shaped to mate in liquid tight engagement with the contours of the interior of mechanisms 100 or 110. These mechanisms 100, 110 in turn must mate in liquid tight engagement with the opening of bottle 300.

As briefly stated above, the thickness of gasket 10 will vary depending upon certain application criteria. For example, outer layers 30, 40 should have an effective thickness to enable gas to permeate through it. The thickness will be dependent upon the downward forces or torque applied to secure mechanism 100, 110 in place on bottle 300. Optimally, it is desired that the thickness of layers 30, 40 and, thus gasket 10, be as thin as possible in order to reduce the amount of material. Therefore, the vertical space or height required in mechanisms 100, 110 should be only enough to receive gasket 10 and permit gas to permeate through the gasket.

The present invention also provides a method for venting gas from a positive pressure generating system in a package, such as a bottle or container. The method includes securing a closure fitting shaped to form a seal at an opening of a package having liquid therein. The closure fitting has gasket 10 that is capable of venting gases while preventing liquid from leaking therefrom.

The present invention also provides a method for sealing an opening in a package. The method comprises the step of securing a closure fitting shaped to form a seal at an opening of a package.

To illustrate the present invention, the following examples are provided. It should be understood that the present invention is not limited to the following:

A cleaning composition set forth below containing hydrogen peroxide was tested. When exposed to adverse conditions, such as elevated temperatures for a prolonged period of time, the hydrogen peroxide decomposes and generates oxygen gas.

| Ingredient | Weight % Active |
|---|---|
| Water | Q.S. |
| Hydrogen Peroxide | 3.00 |
| Cleaning Surfactants | 1.15 |
| Organic Solvents | 2.00 |
| Soil Resist Agents | 0.70 |
| pH Control Agents | 0.40 |
| Preservative | 0.10 |
| Fragrance | 0.15 |

EXAMPLE 1

In Example 1, the tri-layer gasket was placed into twenty-five finger pump sprayers. The finger pump sprayers were then attached to the bottles. A control finger pump sprayer bottle, that did not contain the gasket of the present invention, was also tested. High density polyethylene (HDPE) bottles were filled with 8.5 oz. of the above cleaning composition. The finger pump sprayer was hand torqued onto each bottle. Fifteen of the twenty-five bottles having the gasket were placed in an upright vertical position and maintained in that position for the duration of the test. Ten of the twenty-five bottles were initially placed in an inverted position for one week, then the samples were placed in the upright position. In the latter, the gasket was thus directly exposed to the cleaning composition. In the inverted position, the gasket would not vent. The ten bottles started to swell. If not repositioned to an upright position, the ten bottles would eventually rupture. All samples were placed in a 123° F. temperature controlled chamber. Periodically, the samples were removed from the chamber to measure the width and depth of each bottle. The fifteen bottles in the upright position that had the gasket of the present invention remained relatively unchanged. The control bottle, that did not contain the gasket, experienced a reduction in width and an increase in depth. Results after ten weeks are shown in the following table.

| | Average of 15 Right Side Up | | Average of 10 Inverted Right Side Up | | Single Control Bottle | |
|---|---|---|---|---|---|---|
| Week | Width | Depth | Width | Depth | Width | Depth |
| Initial | 69.9 | 40.8 | 70.0 | 40.8 | 69.0 | 42.7 |
| 1 | 69.7 | 41.2 | 65.9 | 46.3 | 63.7 | 49.5 |
| 2 | 69.5 | 41.4 | 67.7 | 43.7 | 62.4 | 50.9 |
| 3 | 69.5 | 41.4 | 68.1 | 43.2 | 61.7 | 51.7 |
| 4 | 69.6 | 41.5 | 68.1 | 43.3 | 61.8 | 51.8 |
| 5 | 69.5 | 41.3 | 68.9 | 42.2 | 60.3 | 53.0 |
| 6 | 69.5 | 41.5 | 69.0 | 42.1 | * | * |

-continued

| | Average of 15 Right Side Up | | Average of 10 Inverted Right Side Up | | Single Control Bottle | |
|---|---|---|---|---|---|---|
| Week | Width | Depth | Width | Depth | Width | Depth |
| 7 | 69.4 | 41.5 | 68.8 | 42.2 | | |
| 8 | 69.5 | 41.3 | 68.9 | 42.0 | | |
| 9 | 69.5 | 41.3 | 69.0 | 42.1 | | |
| 10 | 69.6 | 41.0 | 69.0 | 42.0 | | |

* Bottle developed leak
** Widths and depths were measured in millimeters using a hand held caliper The results demonstrate that in the upright position, bottles having the pump sprayer equipped with the gasket of the present invention did not deform. They maintained their shape while venting gas pressure build up. Bottles that were first inverted, then repositioned right side up, did not vent at first. While inverted, the bottles started to swell as expected, but did not leak. When the bottles were repositioned, the bottles did vent and started to resume their original shape. The control bottle, which does not have the gasket, swelled to a point where the bottle ultimately split at the seams and the contents of the bottle leaked out.

EXAMPLE 2

A removal torque study was performed comparing a tri-layer gasket bottle against a bi-layer gasket bottle. Four bi-layer and four tri-layer gasket bottles were tested at each application torque level. Sample bottles were each filled with 252 grams of water. Tri-layer and bi-layer gaskets were inserted by hand into finger pump sprayer bottles. The pumps were then placed onto the bottles and hand torqued at 10 inch-lbs., 12 inch-lbs., 15 inch-lbs., and 18 inch-lbs. The sample bottles were left undisturbed for a minimum of forty minutes before removing the pump sprayers and measuring the removal torque required to do so.

| | Average Removal Torque Observed (inch-lbs.) | | | |
|---|---|---|---|---|
| | 10 inch-lbs. | 12 inch-lbs. | 15 inch-lbs. | 18 inch-lbs. |
| Bi-layer | 5.4 | 7.3 | 7.5 | 8.8 |
| Tri-layer | 5.9 | 7.5 | 8.3 | 9.3 |

The above results indicate that sprayer pumps utilizing the tri-layer gasket for venting purposes display a higher removal torque, on average, than the corresponding bi-layer gasket. What this means is that the tri-layer gasket creates a tighter seal, which is shown as its higher resistance to back torquing. Thus, the tri-layer gasket resists loosening of the pump closure on the bottle to a greater degree than the bi-layer gasket.

Having thus described the present invention with particular reference to preferred embodiments thereof, it will be apparent that various changes and modifications may be made therein without departing from the spirit and scope of the invention as defined in the appended claims.

What is claimed is:

1. A gasket comprising:

a liquid and gas impermeable polyaklylene core having a first side and a second side opposite said first side;

a first outer layer being connected to said first side; and a discrete second outer layer being connected to said second side, wherein each of said first and said second outer layers is a gas permeable fluoropolymer, and wherein said first and said second outer layers cooperate with said core to provide gas permeability and liquid impermeability to said gasket.

2. The gasket according to claim 1, wherein said core and said first and second outer layers are laminated together.

3. The gasket according to claim 1, wherein said polyalkylene material is made of polyethylene.

4. The gasket according to claim 1, wherein said fluoropolymer is an expanded polytetrafluoroethylene membrane.

5. The gasket according to claim 1, wherein said core has a thickness about 0.015 inches to about 0.150 inches.

6. The gasket according to claim 1, wherein each of said first and second outer layers has a thickness about 0.001 inches to about 0.050 inches.

7. The gasket according to claim 1, wherein said gasket has an overall thickness about 0.017 inches to about 0.25 inches.

8. The gasket according to claim 1, wherein said gasket is installed in a closure fitting without using an orientation device.

9. The gasket according to claim 1, wherein said gasket is installed in a positive pressure generating system.

* * * * *